(12) United States Patent
Martin et al.

(10) Patent No.: US 8,818,343 B1
(45) Date of Patent: Aug. 26, 2014

(54) METHOD AND SYSTEM FOR REPORTING A SUMMARY RATING OF ACCESSED CONTENT

(75) Inventors: Geoff S. Martin, Overland Park, KS (US); Jonathan R. Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 950 days.

(21) Appl. No.: 11/196,114

(22) Filed: Aug. 3, 2005

(51) Int. Cl.
*H04L 29/06* (2006.01)

(52) U.S. Cl.
USPC ..................................... 455/414.3

(58) Field of Classification Search
USPC .......................... 455/414.1–414.3
See application file for complete search history.

(56) References Cited

U.S. PATENT DOCUMENTS

| | | | |
|---|---|---|---|
| 7,043,555 B1 | 5/2006 | McClain et al. | |
| 7,055,166 B1 * | 5/2006 | Logan et al. | 725/32 |
| 7,149,219 B2 | 12/2006 | Donahue | |
| 7,210,158 B1 * | 4/2007 | Forler | 725/31 |
| 2002/0128033 A1 * | 9/2002 | Burgess | 455/528 |
| 2002/0138830 A1 * | 9/2002 | Nagaoka et al. | 725/14 |
| 2003/0001016 A1 | 1/2003 | Fraier et al. | |
| 2003/0074665 A1 * | 4/2003 | Varley | 725/78 |
| 2004/0148237 A1 * | 7/2004 | Bittmann et al. | 705/35 |
| 2005/0081237 A1 * | 4/2005 | Chen et al. | 725/35 |
| 2005/0086293 A1 * | 4/2005 | Buckley | 709/203 |

\* cited by examiner

*Primary Examiner* — Joel Ajayi

(57) ABSTRACT

A method and system provides for monitoring access to particular network content and providing a summary of the rating of the content accessed. In one embodiment, a telecommunications network entity, such as a mobile access gateway, can identify one or more resources accessed by a wireless device. The gateway can then associate the one or more resources accessed by the wireless device with a rating for each of the resources, and the gateway can provide a summary of the ratings for the resources accessed by the wireless device.

20 Claims, 8 Drawing Sheets

| MIN + area code | Content | Content Rating |
|---|---|---|
| 111-222-3333 | www.URI_1.com\page_1 | PG |
| 111-222-3333 | www.URI_1.com\page_2 | R |
| 987-654-3210 | www.URI_3.com\page_1 | PG-13 |
| 987-654-3210 | www.URI_4.com | X |

Fig. 5

| MIN + area code | Content | Time Accessed | Content Rating |
|---|---|---|---|
| 111-222-3333 | www.URI_1.com\page_1 | 3 minutes | PG |
| 111-222-3333 | www.URI_1.com\page_2 | 30 seconds | R |
| 987-654-3210 | www.URI_3.com\page_1 | 1 minute | PG-13 |
| 987-654-3210 | www.URI_4.com | 10 minutes | X |

Fig. 6

| Content | Content Rating |
|---|---|
| www.URI_1.com\page_1 | PG |
| www.URI_1.com\page_2 | R |
| www.URI_3.com\page_1 | PG-13 |
| www.URI_4.com | X |

Fig. 7

| MIN + area code | Average Content Rating |
|---|---|
| 111-222-3333 | PG-13 |
| 987-654-3210 | R |

Fig. 8

| MIN + area code | Highest Content Rating |
|---|---|
| 111-222-3333 | R |
| 987-654-3210 | X |

Fig. 9

| MIN + area code | Average Content Rating | Highest Content Rating |
|---|---|---|
| 111-222-3333 | PG-13 | R |
| 987-654-3210 | R | X |

Fig. 10

METHOD AND SYSTEM FOR REPORTING A SUMMARY RATING OF ACCESSED CONTENT

FIELD OF THE INVENTION

The present invention relates to telecommunications and, more particularly, to monitoring content accessed via a telecommunications network.

BACKGROUND

The widespread availability of the Internet and mobile communications has ushered in an era of convenience and productivity never before seen. At the same time, however, the ubiquitous nature of the Internet has also brought with it an undesired side effect: youngsters and others who, for one reason or another, should not be accessing certain Web content can now easily do so. It may not be desirable, possible, or practical to completely prevent access to certain Web content, however. It also may not be desirable, possible, or practical to monitor each Web site or Web page that a particular person, such as a child or employee, accesses.

SUMMARY

One embodiment provides for a method of monitoring resources accessed by a wireless device. The method can comprise identifying one or more resources accessed by the wireless device; associating the one or more resources accessed by the wireless device with a rating for each of the resources; and providing a summary of the ratings for the resources accessed by the wireless device.

Another embodiment provides for a method that can comprise (a) receiving a streaming media session request message from a wireless device into a gateway disposed within a wireless carrier's network, wherein the streaming media session request message requests particular streaming media; (b) proxying the streaming media session request message from the gateway to a streaming media server; (c) receiving into the gateway from the streaming media server a response to the streaming media session request message; (d) proxying the response from the gateway to the wireless client device; (e) storing a rating for the particular streaming media in the gateway and associating the rating with the wireless device; (f) repeating steps (a)-(e) one or more times; and (g) providing a summary of the ratings for the resources accessed by the wireless device.

Other embodiments include a system adapted to sit within a communication path between a client device and a content server. The system can comprise at least one communication interface for (a) receiving from the client device a request for a resource, (b) proxying the request to a content server, (c) receiving a response from the content server, and (d) proxying the response to the client device. The system can also comprise data storage and program logic stored in the data storage and executable by at least one processor (i) to identify the resource accessed by the client device, (ii) to associate the resource accessed by the client device with a rating for the resource, and (iii) to provide a summary of the ratings for a plurality of resources accessed by the client device.

A variety of alternatives will become apparent to those skilled in the art upon review of the following detailed description.

BRIEF DESCRIPTION OF THE DRAWINGS

Exemplary embodiments of the present invention are described herein with reference to the drawings, in which:

FIG. 5 is an example table of rating tracker data in accordance with one embodiment;

FIG. 6 is an example table of rating tracker data in accordance with one embodiment;

FIG. 7 is an example table of content rating data in accordance with one embodiment;

FIG. 8 is an example table of a summary of accessed content including an average content rating of content accessed;

FIG. 9 is an example table of a summary of accessed content including a highest content rating of content accessed;

FIG. 10 is an example table of a summary of accessed content including both an average content rating and a highest content rating of content accessed;

DETAILED DESCRIPTION OF EXEMPLARY EMBODIMENTS

1. Exemplary General Network Architecture

Figure 1:
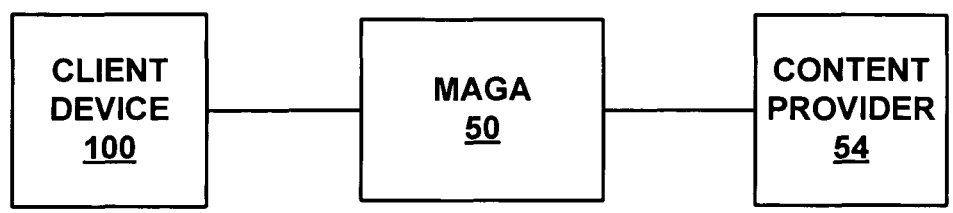
FIG. 1 is a block diagram illustrating an example communications path in accordance with one embodiment.

FIG. 1 illustrates one example of a basic embodiment of a communications path for monitoring access to network communications based on evaluation of content ratings. As depicted in FIG. 1, a client device 100 (such as a mobile phone, wireless personal digital assistant ("PDA"), or personal computer, for instance) can send a content request to a content provider 54 via a media access gateway agent ("MAGA") 50 (such as an access gateway, portal, proxy server, or other entity). The MAGA 50 can log and store a record of the content accessed and a rating for the accessed content and can associate that information with an identification of the client device 100 accessing that content. The MAGA 50 can then provide a summary of the ratings of the content accessed by the client station 100 to a parent, boss, supervisor, regulatory agency, etc.

Figure 2:
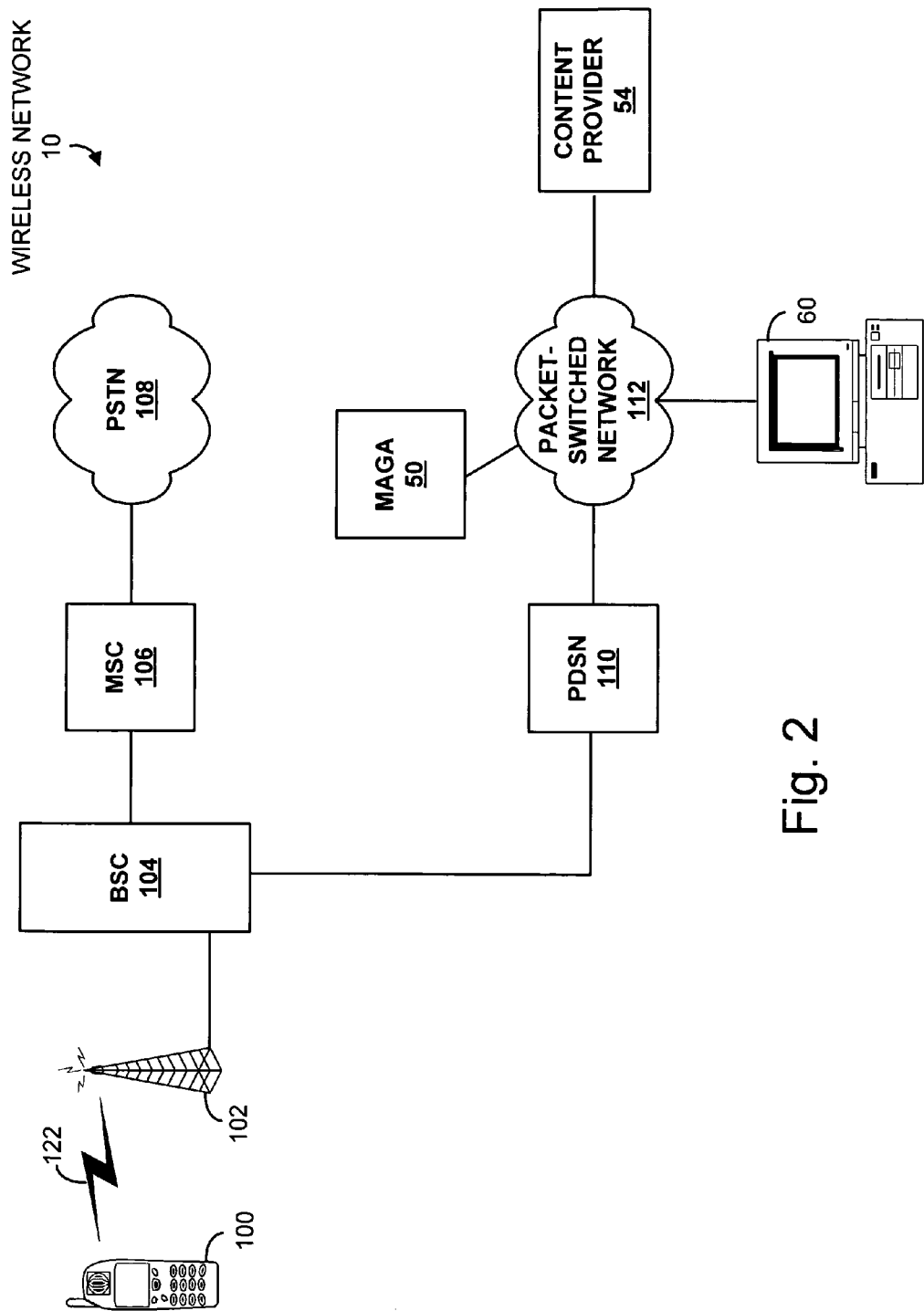
FIG. 2 is a block diagram of an embodiment of an example communication system.

FIG. 2 illustrates one example of architecture of a wireless telecommunications network 10 in which the communication path of FIG. 1 can be implemented. While FIG. 2 depicts one client device 100 accessing the wireless network 10 for voice and/or data services, the wireless network 10 may alternatively simultaneously provide service to a plurality of different client devices.

As shown in FIG. 2, the client device 100 communicates with an access point for the wireless network 10, such as a base station 102, through an air interface 122. The client device 100 can communicate with the base station 102 using a variety of different air interface protocols. In one embodiment, the client device 100 communicates with the base station 102 using code division multiple access ("CDMA"). CDMA provides a method for sending wireless signals between the client device 100 and the base station 102. In a CDMA system, the base station 102 communicates with the client device 100 over a spread spectrum of frequencies.

In a CDMA system, multiple client devices may use the same frequency range, and the multiple client devices may each simultaneously communicate with the base station 102 using the same frequency range. A client device in a CDMA system spreads its signal across the frequency range. Spreading the signal across a wide bandwidth can reduce interference between signals from different client devices. In order to perform signal spreading, each client device may be assigned a unique code, such as a Walsh code, to be used for modulating communications. The code may be a sequence of bits, such as a 64 bit binary number; however, other lengths may also be used. This can allow individual signals to be differentiated from other signals, and, therefore, accurately recovered.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

CDMA is merely one example of a protocol that can be used for communication between the client device 100 and the access point 102. As other examples, the client device 100 and the access point 102 may communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), IS-136, Wireless Application Protocol ("WAP"), time division multiple access ("TDMA"), or other protocols. Additional wireless protocols such as any of the various protocols under the IEEE 802.11 umbrella, Bluetooth, and others may also be used.

The base station 102 couples to a base station controller ("BSC") 104, which can perform various functions such as managing handoffs of the client device 100 as it moves among base stations in the wireless network 10. The BSC 104 in turn connects to a mobile switching center ("MSC") 106. The MSC 106 can manage setup and teardown of connections with the client device 100. While the BSC 104 and the MSC 106 are depicted as separate components, it is possible that their functionality may be combined into a single component. The MSC 106 can additionally provide connectivity to the public switched telephone network ("PSTN") 108. Through this connectivity, the client device 100 may access the wireless network 10 for voice services and in turn establish a circuit switched connection with another device on the PSTN 108, the wireless network 10, or another network.

While a traditional voice connection with the wireless network 10 might involve establishing a circuit-switched connection between the client device 100 and another entity for voice communications, the client device 100 might alternatively establish a data connection with the wireless network 10 in order to engage in packet-switched communications with another entity. In addition to interfacing with the MSC 106 and in turn the PSTN 108, the BSC 104 may also interface with a packet data serving node ("PDSN") 110. The PDSN 110 can provide connectivity to a packet-switched network 112, which could comprise either or both of a private packet-switched network and a public packet-switched network, such as the Internet.

Using this connectivity, the client device 100 can establish a data connection with the wireless network 10 and engage in packet-based communications with devices on the packet-switched network 112. In doing so, the client device 100 might use various protocols to engage in data communications with another device. The client device 100 might also use packet-based voice protocols such as Voice over IP ("VoIP") to engage in voice communications with another device via the client device's data connection with the wireless network 10.

In accessing the wireless network 10 for data services, the client device 100 may establish a Point-to-Point Protocol ("PPP") session with the PDSN 110. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662, and 1663, all of which are incorporated herein by reference in their entirety.

While the client device 100 may communicate with the PDSN 110 through a PPP session, it may communicate with other devices (e.g., a device on the packet-switched network 112) using higher level protocols. For example, the client device 100 may use the Transmission Control Protocol ("TCP")/Internet Protocol ("IP") suite, one protocol suite that may be used for transmitting data over a packet-switched network. Each device, including the client device 100, may then receive a 32-bit IP address. The IP address assigned to a device is usually globally unique, and therefore allows IP packets of data to be routed between different networks to a particular device. An IP packet can include a header portion and a data portion. The header portion generally identifies a source device and a destination device, while the data portion carries the data to be transmitted between the two devices.

Each client device may also be uniquely identified in other ways to facilitate identification. For example, each client device can be hard-coded with a unique electronic serial number ("ESN"), which can be programmed into each client device during manufacture and which can be initially activated by a service provider. In doing so, the service provider can assign a unique mobile identification number ("MIN") to each client device and can establish a record or other profile associating the MIN with the ESN and indicating service parameters for the subscriber (i.e., for the MIN).

A number of other entities can reside on or be accessible through the packet-switched network 112, including, by way of example, the MAGA 50 and a computer 60. Any number of other entities, such as the content provider 54, which, for example, can comprise a content server or other entity, might also reside on or be accessible through the packet-switched network 112, as well, and may host content that the client device 100 can request.

The entities residing on or accessible through the packet-switched network 112 can be arranged in any of a variety of ways. For example, the MAGA 50 might reside within another network entity or entities. As another example, the functions of the MAGA 50 might be integrated with the functions of another network entity. Other configurations are also possible.

In operation, each client device that supports packet-data connectivity can engage in packet-data communication over a packet network, such as the packet-switched network 112, after acquiring a radio link over an air interface and a data link with a PDSN or other gateway. As described generally above, for instance, a client device, such as the client device 100, can send an origination message to a BSC, such as the BSC 104, and/or an MSC, such as the MSC 106, asking for a radio link for packet-data communication. The BSC 104 can then responsively instruct the client device 100 to operate on a given traffic channel over the air interface 122. Through that traffic channel, the client device 100 might then negotiate with a gateway, such as the PDSN 110, to establish a data link such as the PPP session described above. Further, the gateway and/or some other entity such as a mobile-IP home agent or an authentication, authorization, and accounting server (not shown) could assign an IP address to the client device 100 for use in communicating over the packet-switched network 112.

When the client device 100 communicates with the packet-switched network 112 through the PDSN 110, the MAGA 50 can serve as an interface between entities on the packet-switched network 112 and the client device 100. For example, the PDSN 110 can send communications to the MAGA 50 so the communications pass through the MAGA 50 to other entities. The MAGA 50 can also store content ratings information relating to the content that a client device 100 accesses, and can provide that information or a summary of that information to other entities (such as a user operating the computer 60).

Figure 3:
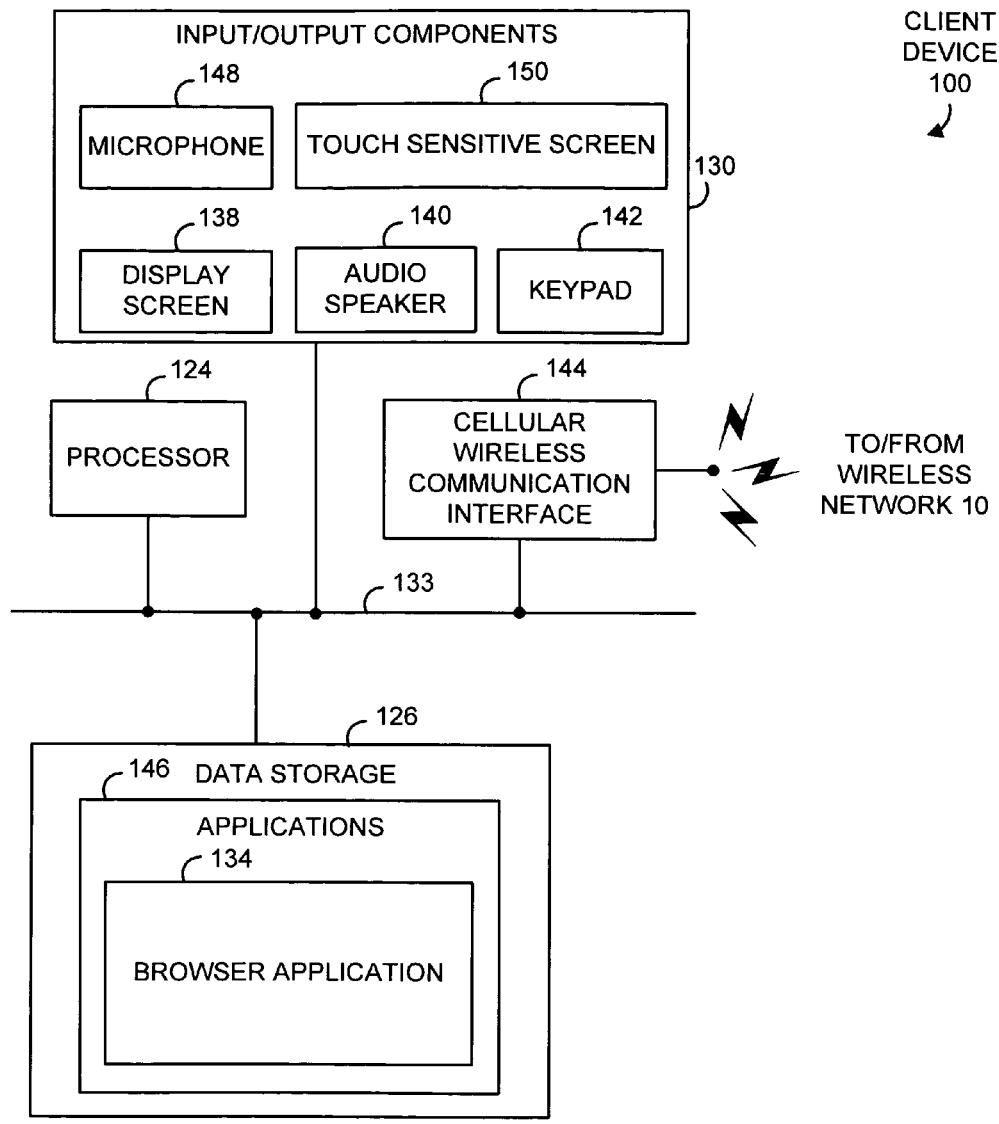
FIG. 3 is a block diagram illustrating example components of a client device.

FIG. 3 is a block diagram showing components of an example client device 100. The client device 100 can include a processor (i.e., one or more processors) 124, data storage 126, and machine language instructions stored in the data storage 126. The machine language instructions can be executable by the processor 124 to perform various functions described herein. The machine language instructions can also define applications 146 that could be stored in the data storage 126. The example client device 100 also includes a cellular wireless communication interface component 144, through which the client device 100 can communicate with the wireless network 10. Further, the client device 100 can include input and output components 130. The various components of the client device 100 (including the processor 124, the data storage 126, the interface component 144, and the input and output components 130) might be coupled together directly or via a system bus 133, for instance. Other arrangements are possible as well.

As shown by way of example in FIG. 3, the input and output components 130 could include a display screen 138, an audio speaker 140, a keypad 142, a microphone 148, and a touch sensitive screen 150. The client device 100 might also include other or additional input and/or output components, or the client device 100 might have fewer input and/or output components than those shown in FIG. 3. In an example embodiment, the client device 100 might have multimedia capabilities such as an ability to display video and play audio. In other embodiments, however, the client device 100 may not have multimedia capabilities, or the client device 100 may be capable of only playing audio or of only displaying video, or it might be limited in some other way, such as by not having a display screen 138 or an audio speaker 140.

The data storage 126 can store applications 146 and data, for example. In alternative embodiments, the applications 146 and/or data might not be stored in the client device 100. In such embodiments, the applications 146 and/or data might be stored remotely on a network server, for example. The remote network server can then be accessible to the client device 100, and the client device 100 may then access such applications 146 and/or data via the wireless network.

As shown in FIG. 3, the applications 146 can include, for example, a browser application 134. The applications 146 might utilize the various input and output components 130 of the client device 100 and, thereby, interact with the user and/or allow the user to interact with the client device 100. For example, one or more applications might output text or video on the display screen 138; play audio on the speaker 140; receive input from the keypad 142, the touch sensitive screen 150, and/or the microphone 148; or perform a combination of these or other actions.

In particular, the browser application 134 might be an application suitable for requesting and receiving packet-data communications in a client device, such as the client device 100. In one embodiment, the browser application 134 might be a WAP enabled Web browser that allows WAP Push communications. In any case, the browser application 134 can request content from the content provider 54 (or another network resource) via the packet-switched network 112, for example. In one embodiment, the browser application 134 can request information from the content provider 54 (or another network resource) by invoking a uniform resource locator ("URL") included in a WAP Push message. For instance, the browser application 134 can request information from the server 52 (or another network resource) via an HTTP GET request. Other examples are also possible.

Figure 4:
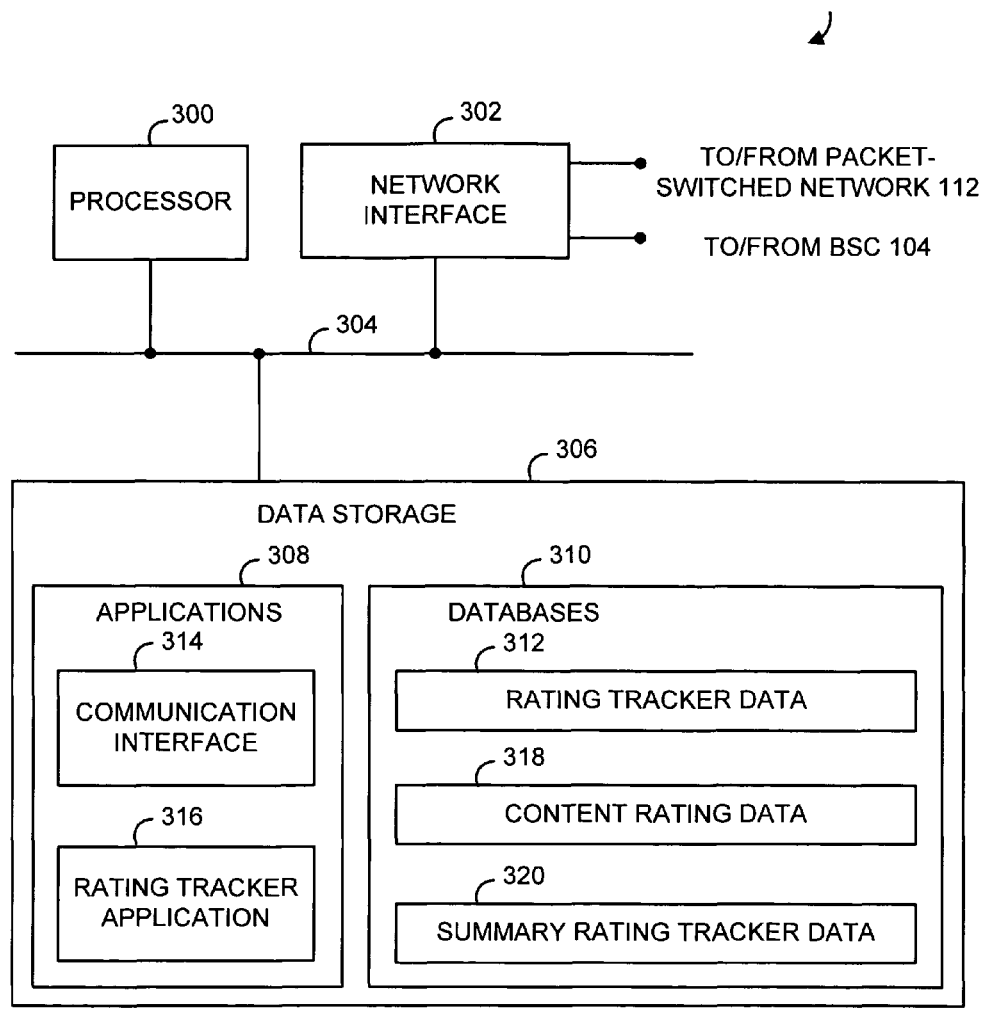
FIG. 4 is a block diagram illustrating example components of a media access gateway agent.

FIG. 4 is a block diagram showing components of an example mobile access gateway agent, such as the MAGA 50 depicted in FIG. 1. As depicted in FIG. 4, the MAGA 50 can include a processor 300, data storage 306, and machine language instructions stored in the data storage 306 and executable by the processor 300 to carry out various functions described herein. The machine language instructions can define applications 308 that can also be stored in the data storage 306. The MAGA 50 might also include one or more network interface components 302 through which the MAGA 50 can communicate with a packet network, such as the packet-switched network 112, for instance, or with an entity of the wireless network 10, such as the BSC 104, for instance. The various components of the MAGA 50 (including the processor 300, the data storage 306, and the network interface 302) can be coupled together directly or via a system bus 304, for instance. Other arrangements are possible as well.

The data storage 306 can include any number of databases 310, applications 308, or other files of information, for, among other things, maintaining rating tracker data and content rating data for client devices, such as the client device 100. In some embodiments, the MAGA 50 can track the ratings of content accessed by a client device and the MAGA 50 can store that information, for example, as rating tracker data 312 in the data storage 306. The rating tracker data 312 can include a plurality of records that contain information that associates each of a plurality of client devices with information on the rating of the content that client device has accessed. Similarly, in some embodiments, the MAGA 50 can store content ratings, for example, as content rating data 318 in the data storage 306. The content rating data 318 can include a plurality of records that contain information that associates particular content with a content rating. The MAGA 50 can also, in some embodiments, store summaries of the ratings of the content accessed by the client device 100, as summary rating tracker data 320. This data can be used to report summary information on the ratings of the content accessed by the client device 100.

FIG. 5 depicts an example table (such as a look-up table, for instance) of rating tracker data 312. In FIG. 5, each record is depicted as a row in the example table and includes a plurality of fields (which are depicted as columns). Thus, in the example table of FIG. 5, each record includes a client device (which, in this example, are identified by each client device's unique MIN plus its area code), identification of content that client device accessed (which, by way of example, are identified as uniform resource indicators ("URIs")), and the rating of that accessed content. In the example of FIG. 5, the first client device listed in the table, identified as 111-222-3333, accessed the content www.URI_1.com\page_1, which has a content rating of PG, and www.URI_1.com\page_2, which has a content rating of R. In other embodiments, a table of rating tracker data 312, such as the table depicted in FIG. 5, might not include a field specifying the content accessed by a client device. Instead, the table may only include the rating of the accessed content. Moreover, other methods of identifying client devices, such as by using unique ESNs, for example, are possible as well.

FIG. 6 depicts another example table of rating tracker data 312. In the example table of FIG. 6, each record includes an additional field labeled "Time Accessed" that identifies the time the client device accessed particular content.

FIG. 7 depicts an example table (such as a look-up table, for instance) of content rating data 318. In FIG. 7, each record is depicted as a row in the example table and includes a plurality of fields (which are depicted as columns). Thus, in the example table of FIG. 7, each record includes an identification of content (which, by way of example, are identified as URIs) and a content rating for the requested content. In the example of FIG. 7, the first content identified in the table, www.URI_1.com\page_1, corresponds to the content rating "PG".

As a general matter, the content ratings contemplated by the invention are intended to relate to suitability of content for presentation to particular classes of people. As such, the content ratings can indicate an appropriate audience for the content (such as that the content is suitable for a particular age group or for other particular types of users), the content ratings can indicate a class of content (such as that the content contains sexually explicit material or violent material), and/or the content ratings can take other forms. By way of example, the content ratings can be identical or analogous to the ratings commonly used by the Motion Picture Association of America (MPAA), such as G, PG, PG-13, R, and X, as partially shown in FIG. 5. As another example, the ratings could more simply be just "High," "Medium," and "Low." As still another example, the ratings could be simple code numbers, such as "1," "2," and "3." Other examples are possible as well.

FIGS. 8-10 depict example tables (such as look-up tables, for instance) of summary rating tracker data 320. The data in these example tables can be used to summarize the rating of the content that the client device 100 has accessed. As one example, a summary of accessed content can include an average content rating of the content accessed, as depicted in FIG. 8. As another example, a summary of accessed content can include the highest content rating, as depicted in FIG. 9. A summary of accessed content can also include both the average content rating and the highest content rating, as depicted in FIG. 10.

As depicted in FIGS. 8-10, the summary ratings can take the same form as the content ratings. For instance, if the content ratings that a particular client device accessed are PG and R, then a summary content rating averaging the rating of the accessed content can be PG-13. As another example, if the content ratings are "High", "Medium", and "Low", and a particular client device accessed content twice, one with a "High" rating and one with a "Low" rating, then a summary content rating averaging the rating of the accessed content can be "Medium." It is also possible however, that a rating system for summarizing content ratings is different than the content rating system. As an example, if a particular client device accessed content rated "PG-13" and "X," the MAGA 50 can translate a summary content rating for the accessed content to simply be "High."

In some embodiments, an average content rating can be calculated by assigning numeric values to the content ratings and then calculating the average content rating of the content accessed. Using the MPAA rating system as one example, one could assign values to the content ratings, such as G=0; PG=2.5; PG-13=5; R=7.5; and X=10. An example calculation could then add the values assigned to the content accessed. The resulting total can then be divided by the number of times content was accessed. Using the client device identified as 111-222-3333 in FIG. 5 as an example, 2.5 (PG rating)+7.5 (R rating)=10, and 10 divided by 2=5. The resulting value can then be reported as PG-13 (which was assigned the value of 5 as indicated above). Other examples are possible as well.

Summary content ratings can also include a time-weighted average content rating. Turning to FIG. 6, for example, an average rating could be calculated using the time the client device accessed particular content. As described above, one such calculation could assign values to the content ratings, such as G=0; PG=2.5; PG-13=5; R=7.5; and X=10. An example calculation could then multiply the values of the content ratings by the number of seconds the content was accessed:

180 seconds×2.5(PG rating)=450; and 30 seconds×7.5(R rating)=225.

The values obtained could then be added (here, to arrive at a total of 675), and the total could then be divided by the total number of seconds content was accessed (here, 675 divided by 210 seconds=3.21). The resulting value can then be reported as the average content rating (in this rating scheme, 3.21 results in a content rating value between "PG" and "PG-13"). Such a model can discount user access of inappropriate content if the user only accessed that content for short periods of time (e.g., if a user accessed an "R" rated Web site by mistake). Other examples are possible as well.

Turning back to FIG. 4, in one embodiment, the data storage 306 of the MAGA 50 can include a communication interface 314 and a rating tracker application 316. The communication interface 314 can receive a content request from the client device 100, and can forward that request to a content provider, such as the content provider 54, for example. The communication interface 314 can then receive the requested content from the content provider and can forward that content to the client device 100. In some embodiments, the communication interface 314 can obtain the content rating from the content provider upon receipt of the requested content. In such cases, the communication interface 314 can communicate the content rating to the rating tracker application 316. In other embodiments, the communication interface can communicate to the rating tracker application 316 which content the client device 100 requested, and the rating tracker application 316 can obtain the rating for that content from the content rating data 318 (from a table such as the table depicted in FIG. 7, for example). In any case, the rating tracker application 316 can then associate the content rating of the accessed content with the client device that accessed that content, and the MAGA 50 can store this information in the rating tracker data 312 (in a table similar to the table depicted in FIG. 5, for example). In some embodiments, the rating tracker application 316 can also obtain the duration of time particular content was accessed, and the MAGA 50 can store that information in the rating tracker data 312 (in a table similar to the table depicted in FIG. 6, for example). Other examples are possible as well.

In an example embodiment, the data storage 306 might reside on the MAGA 50. In other embodiments, some or all of the data in data storage 306 might reside on other devices. In such a case, each data storage device may communicate with the MAGA 50 via a link such as a T1, IEEE 488, or Ethernet link, for example.

To allow packet-data connectivity, the MAGA 50 might connect to a packet network, such as the packet-switched network 112, through a local area network ("LAN"), for example. The MAGA 50 might connect to the LAN using a network interface 202, such as a network interface card ("NIC"), and the LAN, in turn, might provide connectivity to the packet-switched network 112 through an Internet service provider ("ISP") or another gateway. Alternatively, the MAGA 50 might connect to a private intranet (e.g., a core packet network of a wireless service provider) or to another network that provides connectivity to the packet-switched network 112. Further, the MAGA 50 might connect directly to the packet-switched network 112 without connecting through a LAN. The MAGA 50 might also wirelessly connect to the packet-switched network 112.

Figure 11:
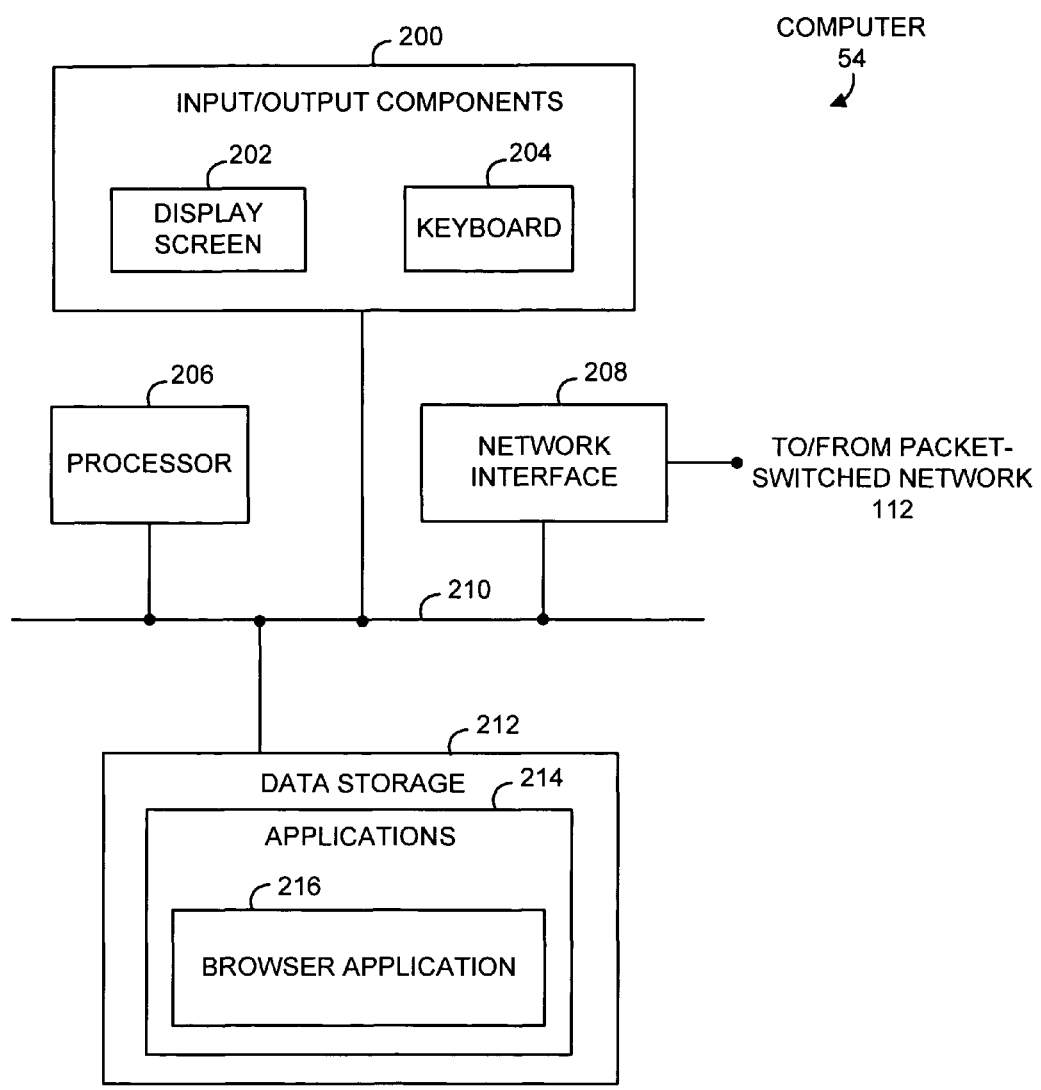
FIG. 11 a block diagram illustrating example components of a computer.

FIG. 11 is a block diagram showing components of an exemplary computer, such as the computer 60 shown in FIG. 2. The computer 60 may be any computing device that is capable of requesting and/or viewing summary rating tracker data 320.

As shown in FIG. 11, the computer 60 might include a processor 206, data storage 212, and machine language instructions stored in the data storage 212 and executable by the processor 206 to carry out various functions described herein. The machine language instructions might define applications 214 that might also be stored in the data storage 212. The computer 60 might also include a network interface component 208 through which the computer 60 might communicate with the packet-switched network 112, for instance. Further, the computer 60 might include input and output components 200. The various components of the computer 60 (including the processor 206, the data storage 212, the network interface 208, and the input and output components 200) might be coupled together directly or via a system bus 210, for instance. Other arrangements are possible as well.

As further shown in FIG. 11, the input and output components 200 might include a display screen 202 and a keyboard 204. The computer 60 may have other or additional input or output components, or the computer 60 might also have fewer input or output components 200 than those shown in FIG. 11.

Applications 214 might be stored in the data storage 212 and executed by the processor 206. In an exemplary embodiment, the data storage 212 might contain a browser application 216. The browser 216 might be an application suitable for requesting and receiving HTTP-based content. In an exemplary embodiment, the HTTP-enabled browser application 132 might be a typical Web browser or an enhancement of a typical Web browser. In any case, the browser application 216 might be capable of viewing summary rating tracker data from a server, such as the MAGA 54, communicating on the packet-switched network 112. Other examples are also possible.

Referring back to FIG. 2, the computer 60 and the MAGA 54 might communicate over the packet-switched network 112. In other embodiments, the computer 60 might communicate with the MAGA 54 over another public or private network. The computer 60 might connect to the packet-switched network 112 in any number of ways. The computer 60 might use a network interface 208, such as a network interface card ("NIC"), to connect to a local area network ("LAN"), for instance. The LAN, in turn, might provide connectivity to the packet-switched network 112 through an Internet service provider ("ISP") or another gateway. Alternatively, the computer 60 might connect to a private intranet or to another network that might provide connectivity to the packet-switched network 112. Further, the computer 60 might connect directly to the packet-switched network 112 without connecting through a LAN. In other embodiments, the computer 60 might also connect to the packet-switched network 112 using a wireless access network.

It should be understood, however, that all the arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

2. Exemplary Operation

Figure 12:
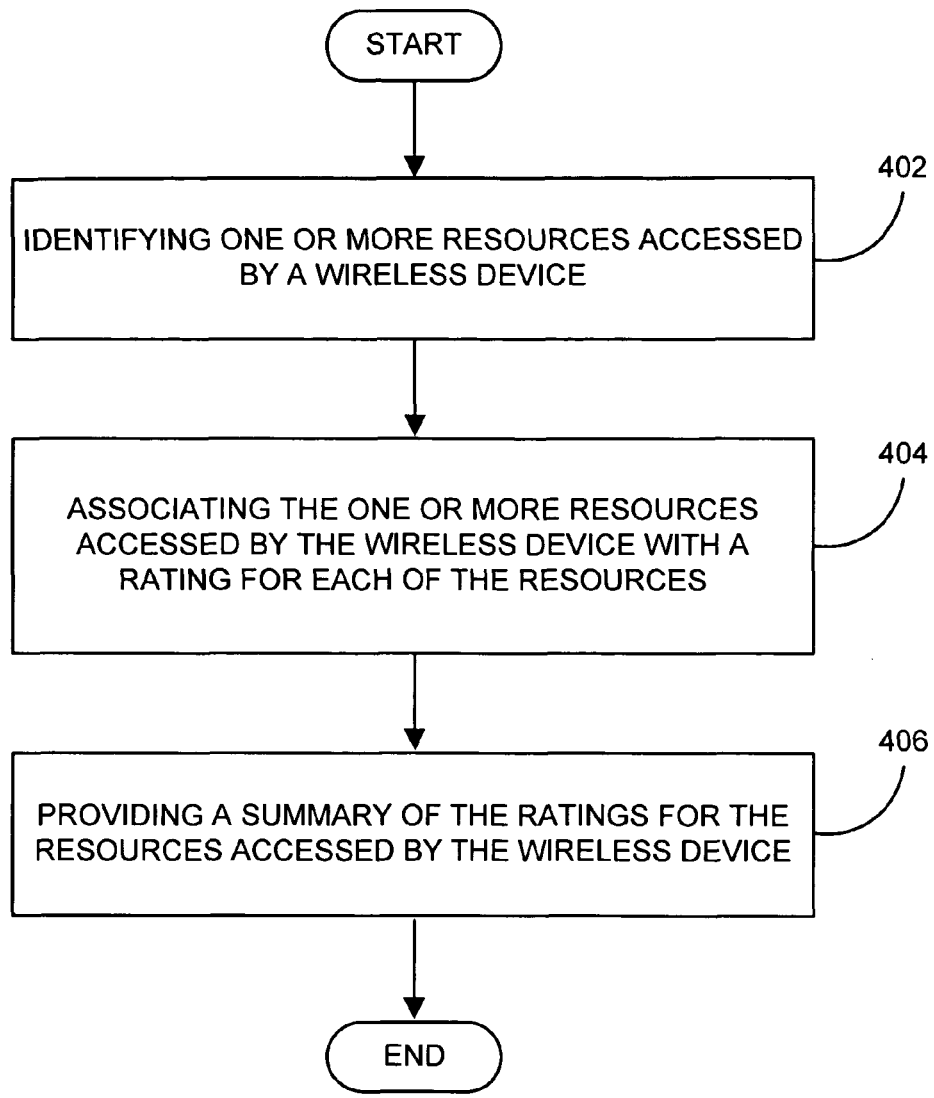
FIG. 12 is a flowchart illustrating a process carried out by a system in accordance with an example embodiment.

FIG. 12 is a flowchart that depicts functions that may be involved in monitoring and reporting on content accessed by a wireless device. At step 402 of FIG. 12, an entity, such as the MAGA 50, for example, identifies one or more resources accessed by a wireless device, such as the client device 100. The client device 100 can access resources by requesting content from a content provider, such as the content provider 54. As a general matter, a program application (for example, the browser application 134) on the client device 100 will generate a request to access a network resource, or content. In some embodiments, the client device 100 can use the WAP protocol to request the content. In other embodiments, the client device 100 can use HTTP or an analogous protocol to request content. Other examples are possible as well.

At step 404 of FIG. 12, an entity, such as the MAGA 50, for example, associates resources accessed by the wireless device, such as the client device 100, with ratings for those resources. Any number of content providers, such as the content provider 54 depicted in FIG. 2, can send content to the client device 100, and the content can include any network resource, such as (individually or in any combination) data, audio, video, text, and games, for example.

Resources accessed by the client device 100 can originate under several different models. In some cases, content can originate from a content distribution infrastructure, sometimes referred to as a "vending machine" model. In the content distribution infrastructure, a wireless service provider can negotiate with partners for the rights to sell content. The wireless service provider can then provide that content to users via a Web server, under a subscription plan or via payment of a fee each time resources are accessed, for example. Further, the wireless service provider (or its partners) can rate this content, and these ratings can be available to (or, in some embodiments, stored in) the MAGA 50 or other network entities.

Other resources can be available from content providers who customize content for access by customers of the wireless service provider, sometimes referred to as a "walled garden" model. In such cases, content providers can customize content normally viewed on the Internet through computers, for example, for use on wireless devices (for example, by adjusting the content to account for smaller display screens, slower access speeds, lower resolution graphics, etc.). The wireless service provider or the content provider can also rate this content, and these ratings can be available to (or, in some embodiments, stored in) the MAGA 50 or other network entities.

Still other network resources can be available simply through users of a client device establishing a data connection with a packet-switched network and entering a particular URL into a browser on the client device. In such cases, a wireless service provider can determine ratings of general "Internet" content by using keywords or metadata from the Web site accessed.

Under any of the models, a content provider, such as the content provider 54, can also provide a content rating for the requested resources. By way of example, if the content provider 54 engages in session-setup signaling to set up a session (for example, streaming media or real time transport protocol ("RTP")) through which to deliver the requested content, the content provider 54 could specify the content rating as a parameter in a session-setup message. For instance, if the content provider 54 provides a session-description-protocol ("SDP") block within such a message, the content provider 54 could specify the content rating as a parameter within the SDP block. As another example, if the content provider 54 returns content in an HTTP response, the content provider 54 could provide the content rating in an HTTP header parameter. Other arrangements are also possible.

In an example embodiment, the MAGA 50 will receive the content request from the client device 100 and will proxy the request along to the content provider 54. The content provider 54 will then return to the MAGA 50 a response message that contains the requested content and/or information related to delivery of the content (such as an SDP block). The content provider 54 can then include the content rating in that or another message that it sends to the MAGA 50. Thus, when the MAGA 50 receives the message from the content provider 54, the MAGA 50 can read the content rating from the message.

In some embodiments, content requests from the client device 100 will be made to pass to the MAGA 50, such that the MAGA 50 could proxy each content request to an appropriate content provider, such as the content provider 54 (if the MAGA 50 has not already cached the content). This allows the requested content from the content provider to pass through the MAGA 50 on its way back to the client device 100.

To accomplish this, the MAGA 50 could be positioned in (or at the edge of) an access channel so that all communications with the client device 100 pass through the MAGA 50. Alternatively, the MAGA 50 could be positioned elsewhere, and the client device 100 (or some other entity) could be set to send content requests from the client device 100 to the MAGA 50. For instance, the client device 100 could be set to use the MAGA 50 as a proxy server so that the client device 100 sends all content requests to the MAGA 50.

As an example implementation, consider a scenario in which a user of a WAP-capable client device, such as the client device 100, for example, seeks to obtain streaming media content. For instance, the user may browse to a Web page and click on a link to receive particular streaming media content. In response (as indicated by the markup underlying the link), a media player application on the client device 100 might send an RTSP "DESCRIBE" request, which would pass to the MAGA 50 for transmission, and in turn to a content server indicated by a URL in the DESCRIBE header.

The MAGA 50 can then proxy the DESCRIBE request to the designated content server (which could correspond to the content provider 54 of FIG. 2). The content server would then return to the MAGA 50 a DESCRIBE response that carries an SDP block with session setup information, such as an indication of the media codec to use and so forth. According to this embodiment, the DESCRIBE response could further contain, in the SDP block for instance, a content rating for the requested content. To allow delivery of the requested content, the MAGA 50 could proxy the DESCRIBE response along to the client device 100 and allow further setup and delivery of the streaming media. (For instance, the MAGA 50 may thereafter proxy one or more RTSP SETUP, PLAY, and other requests from the client device 100 to the content server, and corresponding responses from the content server to the client device 100.)

Note that this example implementation, while described with respect to a wireless device, can equally apply with other sorts of client devices, whether wireless or landline. For instance, if a personal computer seeks to obtain streaming media content, a similar process could apply. Further, the MAGA 50 itself can be the content provider. Other variations are possible as well.

As another example implementation of the invention, consider a scenario where a user of a client device (such as a wireless or landline station) seeks to obtain content from a particular Web page. For instance, the user may attempt to browse to a particular Web page, thereby causing a browser on the client device to send an HTTP GET request. The HTTP GET request would pass to the MAGA 50 for transmission, and in turn to a content server indicated by a URL in the DESCRIBE header.

Conventionally, the MAGA 50 would proxy the HTTP request to the designated content server, and the content server would return to the MAGA 50 an HTTP response that could carry the requested content. The HTTP response can further carry, in an HTTP header for instance, a content rating for the requested content. To deliver the content, the MAGA 50 would proxy the HTTP response (possibly translated to a form appropriate for display on the client device) to the client device.

At step 406 of FIG. 12, an entity, such as the MAGA 50, for example, provides a summary of the ratings for the content accessed by the wireless device. The summary can be accessed by a user via a computer, such as the computer 60 depicted in FIG. 2, for example. In some embodiments, a wireless subscriber, such as a parent, employer, or supervisor, can log into a customer portal on a packet-switched network, such as the packet-switched network 112, to view a ratings summary for a client device. In other embodiments, a wireless subscriber can receive the ratings summary via mail with a bill for wireless services. In still other embodiments, an entity other than a wireless subscriber, such as a regulatory agency, might receive the ratings summary as part of monitoring or "watch-dog" efforts. Other examples are possible as well.

A wireless service provider can provide the summary of the ratings for the accessed resources for a fee. To do this, the service provider could maintain a profile store accessible by the MAGA 50, which indicates for each subscriber (e.g., client device or user) whether the subscriber has paid for or agreed to be charged for the ratings summary service.

If the subscriber has already paid for or agreed to be charged for the ratings summary service, then the MAGA 50 may provide the ratings summary as described above. On the other hand, if the subscriber has not already paid for or agreed to be charged for the ratings summary service, then the MAGA 50 may invoke a charge-advice process through which a charging entity (e.g., the MAGA 50 or another entity) seeks the subscribers' payment or approval to be charged for the service.

In an example-charge advice process, the charging entity may send to the client device 100 or to some other designated destination (e.g., to a parent's, employer's, or supervisor's e-mail address) a prompt to pay or to approve charges for the ratings summary service. The charging entity could send the prompt sent by e-mail, short messaging service ("SMS") messaging, instant messaging, or any of a variety of other means. (If possible, the charging entity could send the prompt in response to the content request provided by the client device 100, and could prompt the user to click a link in order to pay or approve charges.) A recipient of the prompt may then provide a password and payment information (e.g., credit card information) or authorization to be charged (e.g., to the subscriber's monthly telecommunications service account), in a response to the charging entity. Given subscriber payment or authorization to be charged, the charging entity may update the subscriber's profile record to reflect that the subscriber has paid for or agreed to be charged for the ratings summary service, and the MAGA 50 may proceed with the access control functions described above.

3. Conclusion

Several exemplary embodiments of the present invention have been described above. Those skilled in the art will understand, however, that changes and modifications may be made to these embodiments without departing from the true scope and spirit of the present invention, which is defined by the claims.

We claim:

1. A method of monitoring resources accessed by a wireless device, the method comprising:
   identifying one or more resources accessed by the wireless device;
   associating the one or more resources accessed by the wireless device with a rating for each of the resources;
   using the ratings for a plurality of the resources accessed by the wireless device to summarize the ratings for the resources accessed by the wireless device; and
   providing a summary of the ratings for the resources accessed by the wireless device;
   wherein the rating indicates the suitability of the resource for presentation to a particular audience and is provided by an entity providing the resource.

2. The method of claim 1, further comprising receiving into a gateway disposed within a wireless carrier's network one or more requests for resources.

3. The method of claim 1, further comprising receiving into a gateway disposed within a wireless carrier's network the rating for one or more of the requested resources.

4. The method of claim 1, further comprising storing in a gateway disposed within a wireless carrier's network the rating for each of the resources accessed by the wireless device.

5. The method of claim 1, wherein, prior to the wireless device requesting a particular resource, the rating for the particular resources is stored in a gateway disposed within a wireless carrier's network.

6. The method of claim 1, wherein the summary of the ratings includes an indication of an average of the ratings.

7. The method of claim 1, wherein the summary of the ratings includes an indication of a highest rating.

8. The method of claim 1, further comprising:
   collecting information on the duration of time for which the wireless device accessed a resource; and
   associating the duration of time for which the wireless device accessed the resource with the rating of the resource.

9. The method of claim 8, wherein the summary of the ratings includes an indication of a time-weighted average of the ratings.

10. The method of claim 1, further comprising:
    providing a summary of the ratings for the resources accessed by the wireless device only if a subscriber has paid for or agreed to be charged for the summary.

11. The method of claim 10, further comprising:
    determining whether the subscriber has paid for or agreed to be charged for the summary; and
    prompting the subscriber to pay for or agree to be charged for the summary if the subscriber has not yet paid for or agreed to be charged for the summary.

12. A method comprising:
    (a) receiving a streaming media session request message from a wireless device into a gateway disposed within a wireless carrier's network, wherein the streaming media session request message requests particular streaming media;
    (b) proxying the streaming media session request message from the gateway to a streaming media server;
    (c) receiving into the gateway from the streaming media server a response to the streaming media session request message;
    (d) proxying the response from the gateway to the wireless client device;
    (e) storing a rating for the particular streaming media in the gateway and associating the rating with the wireless device;
    (f) repeating steps (a)-(e) one or more times;
    (g) using the ratings for the particular streaming media accessed by the wireless device to summarize the ratings for the particular streaming media accessed by the wireless device; and
    (h) providing a summary of the ratings for the streaming media accessed by the wireless device;
    wherein the rating indicates the suitability of the streaming media for presentation to a particular audience and is provided by an entity providing the streaming media.

13. The method of claim 12, wherein the response to the streaming media session request message carries a rating for the particular streaming media.

14. The method of claim 12, wherein, prior to receiving a streaming media session request message from a wireless device, the rating for the particular streaming media is stored in the gateway.

15. The method of claim 12, wherein the streaming media server resides on the gateway.

16. The method of claim 12, wherein the summary of the ratings includes an indication of an average of the ratings.

17. The method of claim 12, further comprising:
    collecting information on the duration of time for which the wireless device accessed a resource; and
    associating the duration of time for which the wireless device accessed the resource with the rating of the resource.

18. The method of claim 17, wherein the summary of the ratings includes an indication of a time-weighted average of the ratings.

19. A system adapted to sit within a communication path between a client device and a content server, the system comprising:
- at least one communication interface for (a) receiving from the client device a request for a resource, (b) proxying the request to a content server, (c) receiving a response from the content server, and (d) proxying the response to the client device;
- data storage;
- program logic stored in the data storage and executable by at least one processor (i) to identify the resource accessed by the client device, (ii) to associate the resource accessed by the client device with a rating for the resource, (iii) to repeat steps (i) and (ii) one or more times, (iv) to use a plurality of the ratings of the resources accessed by the client device to summarize the ratings for the resources accessed by the client device, and (v) to provide a summary of the ratings for a plurality of resources accessed by the client device;
- wherein the rating indicates the suitability of the resource for presentation to a particular audience and is provided by an entity providing the resource.

20. The system of claim 19, embodied in a gateway on a wireless carrier's network.

* * * * *